Dec. 28, 1965 — W. H. HARDING — 3,226,527
APPARATUS FOR PERFORATING SHEET MATERIAL BY LASER
Filed Oct. 23, 1963 — 3 Sheets-Sheet 1

INVENTOR.
WILLIAM H. HARDING
BY John P. Chandler
HIS ATTORNEY.

Dec. 28, 1965     W. H. HARDING     3,226,527
APPARATUS FOR PERFORATING SHEET MATERIAL
Filed Oct. 23, 1963     3 Sheets-Sheet 2
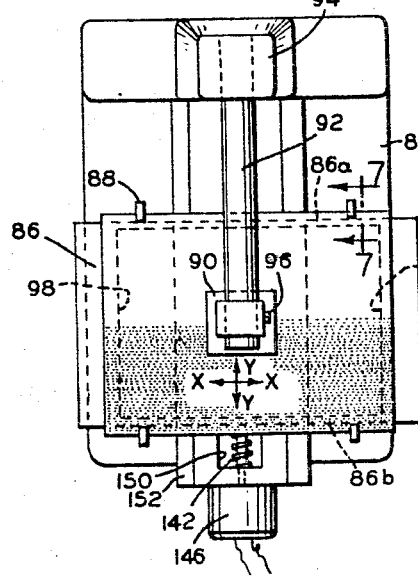
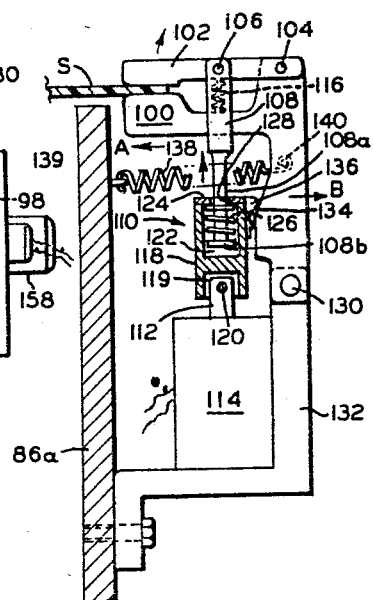
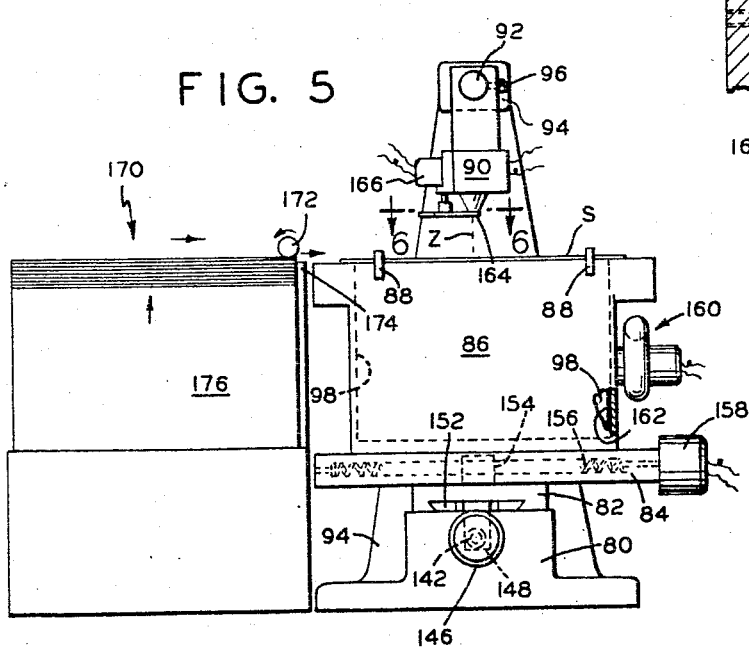
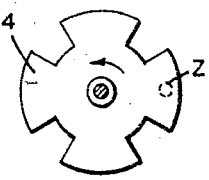
INVENTOR.
WILLIAM H. HARDING
BY *John P. Chandler*
HIS ATTORNEY.

Dec. 28, 1965  W. H. HARDING  3,226,527
APPARATUS FOR PERFORATING SHEET MATERIAL
Filed Oct. 23, 1963  3 Sheets-Sheet 3
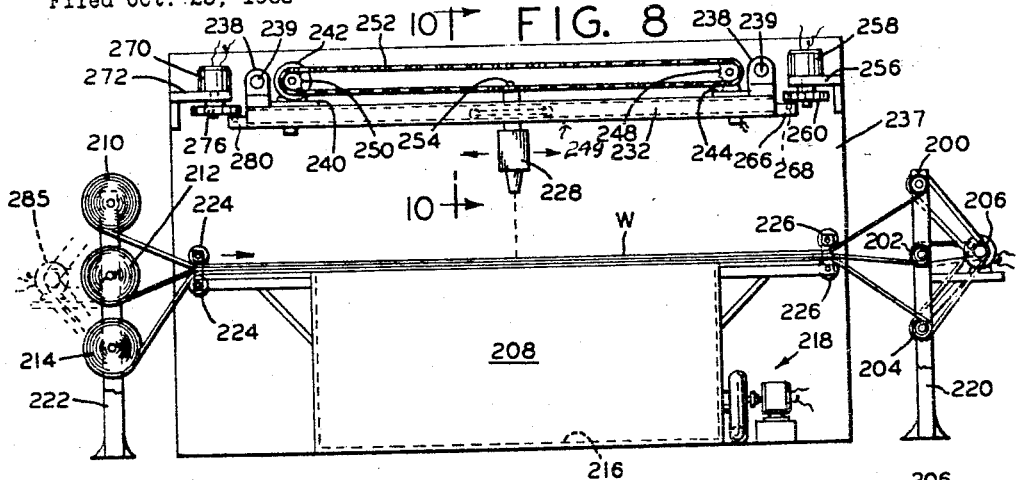
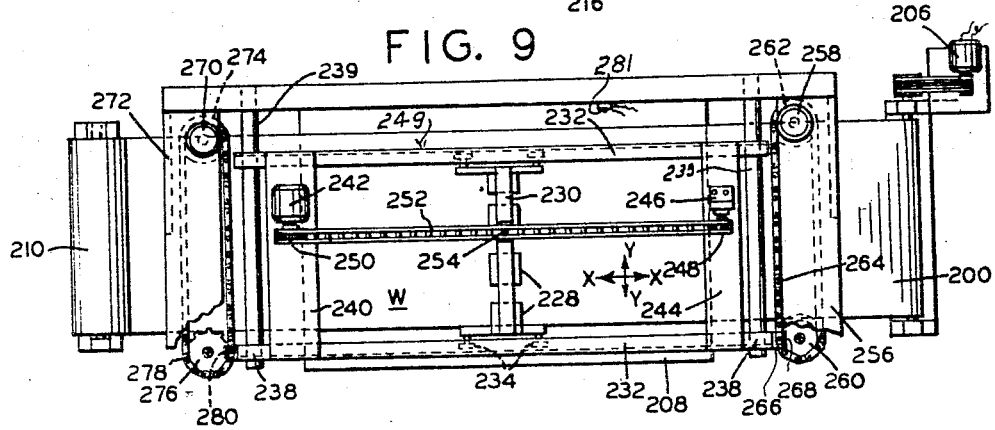
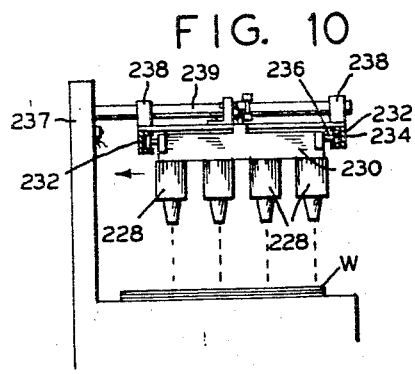
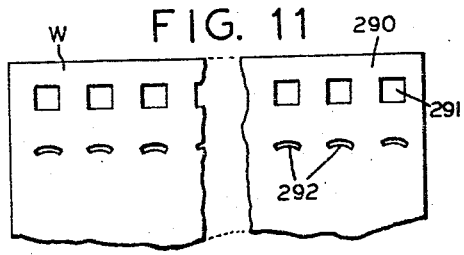
INVENTOR.
WILLIAM H. HARDING
BY John P. Chandler
HIS ATTORNEY.

United States Patent Office 3,226,527
Patented Dec. 28, 1965

3,226,527
APPARATUS FOR PERFORATING
SHEET MATERIAL
William H. Harding, 5 Spring Hill Road,
Westport, Conn.
Filed Oct. 23, 1963, Ser. No. 318,353
12 Claims. (Cl. 219—384)

This invention relates to an apparatus and method for perforating sheets and webs of various materials by the use of a powerful laser beam or a plurality of such beams. The materials in which the holes or perforations can be made, in varying sizes, patterns and spacings, by the method and apparatus of the present invention, are virtually limitless and include plastic films and sheets and other film and sheet materials such as paper, metals and the like.

An important object of the invention is to provide an apparatus and method for making perforations in a wide variety of sheet materials and of a diameter smaller than has been economically possible by any existing methods. The method is not limited, however, to the formation of round holes since they may have irregular shapes and varying sizes and spacings.

The art of forming an all-over pattern of perforations in sheets and films is very old and some of the commonly used methods are the punch and dies method, "stab" punching, the use of hot needles, drilling and electrical discharge methods. Some of the more sophisticated methods include the Schaar process (U.S. Patent 3,012,918) which is limited to very thin films, i.e., with a maximum thickness of 3 mils. This is also the case with the electric discharge method. Another one is the E.S.B.-Reeves or starch diffusion process. In the latter process the hole size may vary due to the granule breakdown during mixing and calendering and there is no regular pattern.

Of the more common methods earlier enumerated, it is impossible to obtain small holes. For instance, in the punch and die method, it is very difficult to obtain hole sizes as small as 16 mils and the average is in the range of 30 to 45 mils. Also, damage to tools runs the cost very high which is also the case with drilling. In stab punching, no material is removed by the tapered punch and the holes may gradually close. The hot needles approach is not good because 30 mils is about the minimum diameter and the holes are not clean.

The use of a narrow, intense beam of laser light properly focused and over a short distance can vaporize any known material. Because of the narrowness of the laser beams when focused on small areas at close range, holes of exceedingly small size can be formed in the material.

A battery of laser beams will produce the perforations at a higher rate of speed than a single laser but this presents the problem of spacing the holes ever so closely. For a hole diameter and a spacing of 15 mils the number of holes per square inch would be in the neighborhood of 1800 and it would be manifestly impossible to place the laser light sources close enough together to form the perforations in a single pass. This is true notwithstanding the fact that lasers are rapidly being constructed which are smaller and lighter. If a single source of the laser beam is used the time required to form a large number of perforations would be enormous. The present invention employs a laser of either the pulsed or continuous type and includes a power supply and focusing devices. It should be equipped with means to interrupt the beam such as a shutter, a power interrupter, or a so-called "Q-Spoiler" such as a rotating prism or a Kerr cell. This pulsed beam may have straight-line travel and the travel synchronized with the pulsations in order to obtain a series of holes of predetermined spacing rather than a straight line cut. By thus supplying an interrupted beam, there would be produced individual holes and a plurality of the lasers, preferably mounted on a traversing device over a web which is moving continuously or intermittently, may be used to perforate any desired pattern of openings. A continuous or rapidly pulsing laser may also be used to cut perforations of different sizes and configurations.

Unlike the punch and die method of hole forming the web or sheet need only be supported along its edges and the relative cost of perforating larger quantities of the sheet material is relatively low.

In the drawings:

FIG. 4 is a plan view of a sheet perforating machine;

FIG. 5 is a front elevational view of the machine of FIG. 4;

FIG. 6 is a sectional view taken along line 6—6 of FIG. 5;

FIG. 7 is an elevational view partly in section of a clamping device, taken substantially along line 7—7 of FIG. 4;

FIG. 8 is a front elevational view of a multiunit perforating machine;

FIG. 9 is a plan view of the machine of FIG. 8;

FIG. 10 is a sectional view taken along line 10—10 of FIG. 8; and

FIG. 11 is a broken view of a work piece showing typical perforations.

Figure 1:
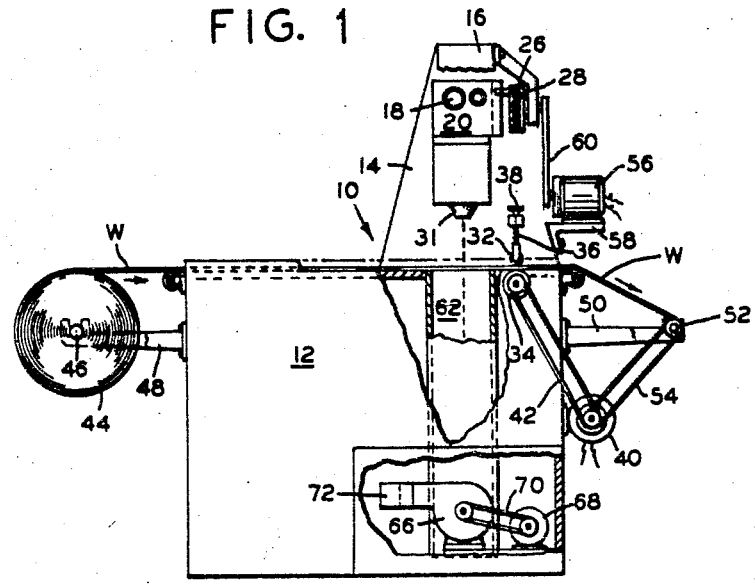
FIG. 1 is a side elevation partly in section of a web feeding machine embodying the present invention.
Figure 2:
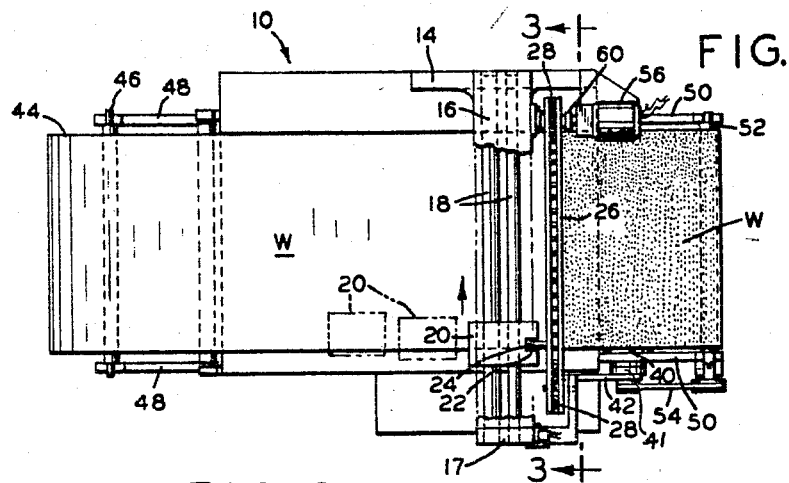
FIG. 2 is a plan view of FIG. 1.
Figure 3:
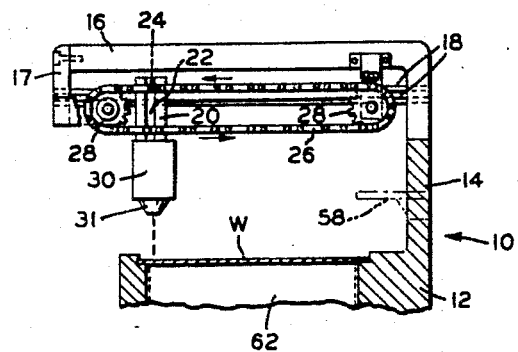
FIG. 3 is a broken section taken along line 3—3 of FIG. 2.

Referring to FIGS. 1, 2 and 3, a frame 10 includes a bed 12 and a vertical extending portion 14 which carries a bridge section 16. A pair of horizontal shafts 18 are supported at one end in the vertical portion 14 of the frame 10 and the other end is fastened in a removable end piece 17. A carriage 20 is slidably mounted upon the shafts 18 for movement transversely of the bed 12 of the machine. A slot 22 which is formed in the carriage 20 receives a pin 24 projecting from a chain 26 which extends parallel to the shafts 18 and adjacent the carriage 20. Two sprockets 28, mounted at opposed ends of the bridge 16 serve to carry the chain 26. A laser 30, with a pulsed beam and having focusing means 31 at its output end, is attached in a depending manner to the carriage 20 so that its output end points downwardly toward the bed 12 in order to project light energy through a web W, which is driven across the bed by a pair of spring-biased rollers 32 and 34. While the web W is shown here as being in a horizontal position, the apparatus could be modified to place it in a vertical position. The upper roller 32 carries a spring 36 at each end the pressure of which is adjustable by a knob 38. The lower roller 34 is the drive roller which in turn is driven by a motor 40 through a belt 42 and having a one revolution clutch 41. A micro-switch (not shown) on each side of the frame is engaged by the carriage 20 at the end of each stroke which closes circuit and drives the web one increment. The web roll 44 is mounted upon a shaft 46 which is supported in an arm 48 attached to the bed 12 of the machine. The take-up roller is supported in arms 50 on the opposite side of the machine and the shaft 52 of the take-up roller is driven also by the motor 40 through a belt 54. A second motor 56 attached to the vertical frame 14 by a bracket 58 drives the rear sprocket 28 through a belt 60 for moving the carriage and laser.

A pit 62 is constructed in the bed 12 of the machine to receive and dissipate the unexpended energy of the perforating beam. The pit extends transversely of the bed 12 and substantially the same width of the web. A blower 66 which is driven from a motor 68 by a belt 70 is used to ventilate the pit by exhausting the air from the pit through a duct 72 to the rear of the machine.

It will be apparent that the sheet material perforated by the apparatus of the present invention will have a wide variety of industrial uses including filtering and screening. Since it has not been possible to form perforations as small as those produced by the apparatus of the present invention, a variety of new uses will be found for corrosion resistant screens having minute openings.

A modification of the present device is shown in FIGS. 4 through 7 which is designed for the purpose of perforating sheet material in contrast to the web or roll type described above. This machine comprises a base 80 upon which a table 82 is mounted for transverse movement, and a second table 84 is mounted upon the table 82 for longitudinal movement. A bed 86 is secured to the longitudinal table 84. Clamps 88, secured to the top edges of the bed hold the sheet material S during the operation.

A laser 90 is supported in proper spaced relation above the sheet materials by a beam 92 projecting from a vertical column 94 in a manner overhanging the table and bed section. The column 94 is positioned rearwardly of the table sections and is attached to the base 80. The laser 90 can be positioned anywhere, in a transverse position, along the beam 92 and is held by a clamping bolt 96 against movement. The bed 86 is constructed with a pit 98 of substantially the same horizontal area as the sheet S to dissipate the excess energy from the perforating beam.

In practice, it will be noted that the sheet S is figured to slightly overhang the edges of the pit to support the sheet against dropping into the pit. Any type of guides or stops can be used to locate the sheet S in proper position over the pit 98. However, in the case of extremely thin and flexible material a special type of holder is required to support the sheet against sagging. This is accomplished by a holder or clamping device as best shown in FIG. 7.

The edge of the sheet material S is gripped between a bottom jaw 100 and a top jaw 102 which is movable relative to the bottom jaw in a manner pivoting about a pin 104 in the bottom jaw for clamping and unclamping the material. A pin 106, projecting from the side of the movable jaw 102, is connected to the end of a rod 108 which is attached, through an intermediate mechanism 110, to a plunger 112 of a solenoid 114. It will now become apparent that when the solenoid 114 is energized the plunger 112 will be pulled into the magnetic field therein and consequently will pull the rod 108 and jaw 102 against the sheet S to clamp it between the jaws 100 and 102. A compression spring 116 is located between the jaws 102 and 100 tending to urge them apart and thus upon de-energizing the solenoid the sheet S will be released from the grip of the jaws.

The intermediate mechanism 110 comprises a cylindrical member 118 having a shallow opening 119 at one end to receive the end of the plunger 112 to which it is pivotally connected by a pin 120. The free end of the member 118 is constructed with a relatively deep opening 122 to receive the reduced end of the rod 108 having a flanged end 108b. A cover 124 having a hole 128 to permit the rod 108a to extend therethrough is fastened to the end of the member 118 by any convenient means such as brazing.

A second compression spring 126, of considerably greater strength than the spring 116, encircles the rod 108a with one end thereof pressing against the flange 108b and the free end pressing against the cover 124. The jaw 100 is constructed in a substantially inverted L shape having its free end pivotally mounted upon a pin 130 in a bracket 132 which is fastened to the wall 86a of the bed 86. It will be noted that the bracket 132 also supports the solenoid 114. A cam surface 134 is constructed on the inverted L shaped jaw 100 and cooperates with a cam follower 136 which is attached to and protrudes from the cylindrical member 118. A tension spring 138 is attached at one end to an eye 139 in the wall 86a and at the free end to a pin 140 in the jaw 100 to urge the jaw 100 in the direction of the arrow A thus bringing the cam surface 134 against the cam follower 136, so that movement of the plunger 112 into the solenoid 114, by energizing it, would cause the cam follower 136 to move along the cam surface 134 thus urging the jaw 100 to pivot about the pin 130 in the direction of the arrow B, thus holding the sheet S taut.

The X—X, Y—Y motion of the sheet S beneath the laser 90 for perforating the sheet is accomplished by movement of the tables 82 and 84. The table 82 is moved in the Y—Y direction by any convenient means such as a screw 142 which is journalled in the base 80. A motor 146 drives the screw in a rotatable manner thus causing a nut 148 to move axially of the screw. The nut 148 is fastened to the table 82 and depends into an opening 150 in the base 80 to cooperate with the screw 142. It will become apparent that movement of the nut 148 will carry the table 82 along the ways 152 in the Y—Y direction. A second nut 154 is fastened to the top of the table 82 and projects into an opening in the table 84 similar to the opening 150 in the base. Also, located within this opening in the table 84 is a screw 156 which is journalled at either end in the table 84 and is driven at one end by an electric motor 158 which consequently moves the table 84 upon its respective ways in the X—X direction. A blower system generally indicated 160 serves to exhaust heated air from the pit 98 in the bed 86.

In the event that the accumulation of heat becomes very great on account of the type of work being done the walls and surfaces of the pit 98 can be coated with a heat resistant material such as a ceramic 162.

In order to obtain spaced perforations in the sheet S, it is necessary to interrupt the energy beam Z while the tables 84 and 82 carry the sheet in the X—X and Y—Y directions. This can be accomplished by any means such as a mechanical shutter 164 mounted adjacent the nozzle of the laser 90 as best shown in FIG. 5. This can be driven by an electric motor 166 which is synchronized with the motors 158 and 146 for required spacing of the perforations.

If desirable or necessary, a feeding system for delivering individual sheets of material S automatically to the machine can be utilized as indicated generally 170. Basically these systems comprise a driving roller 172 which feeds individual sheets from a dispenser 176 over a stop 174.

Another modification is shown in FIGS. 8 through 10, wherein three thicknesses of web material W can be perforated simultaneously. The number of thicknesses may be more or fewer, depending on the nature of the material to be perforated and the intensity of the laser beams. Three take-up rolls 200, 202 and 204 which are driven by a motor 206 draw the web material W across the bed 208 from three feed rolls 210, 212 and 214. The bed 208 is constructed with a pit 216 and an exhaust system generally indicated 218. The take-up rolls are supported outside the machine by rack 220 and the feed rolls by rack 222. However, if desired, they can be built as part of the machine. A pair of idler rollers 224 at one end of the bed and 226 at the other end serve to align and iron out the web material. Any type of guide members, such as the clamping device described above, can be used to guide and hold the web as it traverses the bed, 208.

A bank of 4 lasers 228 are mounted in spaced relation above the web in a manner to focus the beam downwardly toward the web. A beam 230 supports the lasers 228 in spaced relation transversely of the web so that in operation a complete transverse line of perforations can be accomplished by moving the lasers one quarter of the complete transverse distance. The beam 230 is supported between two spaced channel members 232 in which rollers 234 run. The rollers 234 are attached to shafts 236 projecting from either end of the laser support or beam 230. Channels 232 extend longitudinally of the machine and are supported by brackets 238 upon shafts 239 projecting from the back wall 237 of the machine. A crossplate 240 extends between the channels 232 at one end to support a motor 242 and a second crossplate 244 is mounted at the opposite end of the channels 232 and carries a bracket 246 for supporting an idler sprocket 248. Channels 238 together with crossplates 240 and 244 form a rigid rectangular frame 249. Motor 242 carries a sprocket 250 for driving a chain 252 extending between the sprockets. The support 230 which carries the lasers 228 is attached to the chain at a point 254 to produce the X—X travel of the lasers. A bracket 256 extending from the wall 237, adjacent and parallel to one of the shafts 239 supports a reversible motor 258 at one end and a sprocket 260 at the other end. The motor 258 carries a sprocket 262 which drives a chain 264 which moves the frame and lasers in the Y—Y direction by virtue of frame extensions 266 attached to the end of the right hand end of channel 232. A driving pin 268 carried by the chain 264 enters a slot in the frame extension to drive said frame. In order to provide even and consistent motion another reversible motor 270 is mounted upon a bracket 272 at the opposite end of the frame and drives coincidentally with the motor 258 by virtue of a sprocket 274 carried on the motor shaft, a sprocket 276, and chain 278 attached to a frame extension 280 on the opposite end of the channel 232.

In operation, the unperforated layers of the webs overlie the bed 208 and the reversible motor 258 then starts which drives the frame across the web from the position shown in FIG. 9 to back wall 237 where the frame engages microswitch 281 which reverses motor 258 and starts motors 242 and 246 to drive the laser support one increment. This latter travel for a small fraction of an inch is complete before motor 258 drives the frame back to the position of FIG. 9 where it encounters a second microswitch (not shown) at the front of the machine (when viewed as in FIG. 9). This continues at a very rapid pace until the entire section overlying the bed is perforated, after which motor 206 is actuated to move its webs until a fresh unperforated section overlies the bed.

If it is desirable to have continuous motion of the web one line of perforations for each laser can be made the full length of the web at which time the web is rerolled in reverse direction by a motor 285 generating a second line for each laser along the complete length of the web, and so on until the total web is perforated.

FIG. 11 shows a broken plan view of a typical work piece 290 having generally square holes 291 and quarter moon shaped holes 292. It will be understood that holes of any shape may be formed with the apparatus of the present invention. For instance if holes of the configuration shown at 292 are desired, a mark of that shape is incorporated into the focussing arrangement or, if desired, the laser light source, instead of having the straight line travel transversely of the work piece, may be guided by cams having the same contour as its curved holes can modify this straight line travel.

It will be apparent from the foregoing that perforations of smaller diameter can be made in heavier gauge materials by the apparatus of the present invention than was previously possible and the cost of such work is far less than with existing methods.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. Apparatus for perforating material in the form of sheets and webs by the use of a laser beam comprising a support for the material along its edges and having an opening below the central section of the material to be perforated to dissipate unexpended energy from the perforating beam, a laser light source which is movable across the material, means for interrupting the light source to form a row of apertures in the material, and means for moving the material relative to the source after each pass of the light source over said material.

2. The structure recited in claim 1 wherein the means for interrupting the light source is a movable shutter.

3. The structure recited in claim 1 wherein a pulsed beam is used for the light source and the light source is moved intermittently between pulses.

4. The structure recited in claim 1 wherein an exhaust fan is used to vent gases from said opening.

5. Apparatus for perforating material in the form of sheets and webs by the use of a laser beam and comprising a bed forming a support for the material along its edges and having an opening below the central section of the material to be perforated to dissipate unexpended energy from the perforating beam, a frame extending upwardly from the bed, a carriage mounted on the frame for movement transversely of the bed and supporting the laser light source, means for interrupting the light source to form a plurality of apertures in the material, and means for moving the bed after each pass of the light source over said material.

6. Apparatus for perforating sheet material by the use of a laser beam comprising a bed forming a support for the material along its edges and having an opening below the central section of the material to be perforated to dissipate unexpended energy from the perforating beam, means for feeding sheets to the bed and for securing them during the perforating operation, a laser light source which is movable across the material, means for interrupting the light source to form a plurality of spaced apertures in each pass over the material, and means for moving the bed after each pass of the light source over said material.

7. Apparatus for perforating sheet material by the use of a laser beam comprising a bed forming a support for the material along its edges and having an opening below the central section of the material to be perforated to dissipate unexpended energy from the perforating beam, means for feeding sheets to the bed and clamping jaws on the bed along the edges of the sheet for securing them during the perforating operation, an electromagnetic means for closing said jaws and moving them outwardly of the sheet to hold the same under tension, a focussed laser light source which is movable across the material, and means for interrupting the light source to form a plurality of apertures in each pass over the material, and means for moving the material after each pass of the light source over said material.

8. Apparatus for perforating webs of material by the use of a laser beam comprising a bed, feed and take-up rollers for the webs at opposite ends of the bed, the bed having an opening below the web to dissipate unexpended energy from the perforating beam, a laser light source which is movable across the material, means for interrupting the light source to form a plurality of apertures in the material, and means for moving the material after each pass of the light source over said material.

9. Apparatus for simultaneously perforating a plurality of webs of material by the use of a laser beam comprising a bed having a central opening therein to dissipate unexpended energy from the perforating beam, a plurality of feed and take-up rollers at opposite ends of the bed supporting layers of the material, a frame extending upwardly from the bed, a carriage mounted on the frame for movement across the bed and supporting the laser light source, means for interrupting the light source to form a plurality of apertures in the material, and means for moving the webs after each pass of the light source over said material.

10. Apparatus for perforating webs of material by the use of laser beams comprising a bed, feed and take-up roller for the web at opposite ends of the bed, the bed having an opening below the central sections of the web to be perforated to dissipate unexpended energy from the perforating beam, a frame above the bed, a beam which is movable longitudinally of the bed, a plurality of laser light sources mounted on said beam, means for interrupting the light sources to form a plurality of rows of apertures in the web, means for moving the light source transversely of the web, and means for moving the web after a section thereof overlying the bed has been perforated.

11. Apparatus for perforating webs of material by the use of laser beams comprising a bed, feed and take-up roller for the web at opposite ends of the bed, a frame above the bed, a support carried by the frame which is movable in one direction relative to the bed, a plurality of laser light sources mounted on said support, means for interrupting the light sources to form a plurality of apertures in the web as the support travels over the means for moving the light source in a second direction, and means for moving the web after a section thereof overlying the bed has been perforated.

12. Apparatus for perforating webs of material by the use of a laser beam comprising a bed, feed and take-up rollers for the webs at opposite ends of the bed, the bed having an opening below the web to dissipate unexpended energy from the perforating beam, a laser light source which is movable relative to the material, means for interrupting the light source to form a plurality of apertures in the material, and means for moving one of the members after a row of perforations has been made.

References Cited by the Examiner

UNITED STATES PATENTS

| 2,481,048 | 9/1949 | Smith | 19—3 |
| 3,017,486 | 1/1962 | Kogan et al. | 219—83 |
| 3,112,850 | 12/1963 | Garibotti | 225—2 |
| 3,154,370 | 10/1964 | Johnson | 346—108 |
| 3,157,553 | 11/1964 | Spallina | 156—515 |

OTHER REFERENCES

Electronics, "Lasers," vol. 34, No. 47, pp. 54–57, Nov. 1961.

Factor, "Taming the Laser Ray For Industry," vol. 120, No. 4, pp. 96–97, April 1962.

RICHARD M. WOOD, *Primary Examiner.*

V. Y. MAYEWSKY, *Assistant Examiner.*